(12) United States Patent
Zhu et al.

(10) Patent No.: US 10,737,952 B2
(45) Date of Patent: Aug. 11, 2020

(54) METHOD FOR INITIATING A GRAPHENE OXIDE THROUGH REDUCTION BY A REDUCTANT TO CONTROLLABLY RELEASE ORGANIC COMPOUNDS

(71) Applicants: PEKING UNIVERSITY, Beijing (CN); NANJING UNIVERSITY OF SCIENCE AND TECHNOLOGY, Nanjing (CN)

(72) Inventors: Dongqiang Zhu, Beijing (CN); Bingyu Wang, Nanjing (CN); Chenhui Wei, Beijing (CN)

( * ) Notice: Subject to any disclaimer, the term of this patent is extended or adjusted under 35 U.S.C. 154(b) by 197 days.

(21) Appl. No.: 16/155,212

(22) Filed: Oct. 9, 2018

(65) Prior Publication Data

US 2019/0389743 A1    Dec. 26, 2019

(30) Foreign Application Priority Data

Jun. 26, 2018  (CN) .......................... 2018 1 0673157

(51) Int. Cl.
| | |
|---|---|
| *C02F 1/28* | (2006.01) |
| *B01J 20/20* | (2006.01) |
| *B01J 20/34* | (2006.01) |
| *G01N 30/14* | (2006.01) |
| *G01N 30/02* | (2006.01) |
| *C02F 101/36* | (2006.01) |

(52) U.S. Cl.
CPC ............ *C02F 1/283* (2013.01); *B01J 20/205* (2013.01); *B01J 20/3416* (2013.01); *B01J 20/3475* (2013.01); *G01N 30/14* (2013.01); *C02F 2101/36* (2013.01); *C02F 2303/16* (2013.01); *G01N 2030/027* (2013.01); *G01N 2030/143* (2013.01); *G01N 2030/146* (2013.01)

(58) Field of Classification Search
None
See application file for complete search history.

(56) References Cited

U.S. PATENT DOCUMENTS

2017/0151548 A1* 6/2017 Tour ....................... B01D 15/08
2017/0369333 A1* 12/2017 Heidarizad ............ B01J 20/205

* cited by examiner

*Primary Examiner* — Chester T Barry
(74) *Attorney, Agent, or Firm* — W&K IP

(57) ABSTRACT

The present invention discloses a method for initiating a graphene oxide (GO) through reduction by a reductant to controllably release organic compounds, comprising the following steps: (1) mixing GO and a buffer solution; (2) further mixing with a sewage containing organic contaminants; (3) conducting solid-liquid separation, mixing the solid phase and the pure, introducing and $N_2$; (4) further adding the reductant; (5) conducting sequential batch kinetics experiment. The present invention utilizes the size effect and polarity control of GO to selectively adsorb aromatic organic contaminants in sewage and fully transfer the selectively adsorbed organic contaminants from a large amount of sewage to a small amount of pure water by initiating using the reductant, and no extraction of the organic phase is required, the time for purification is reduced, and the energy consumption for purification is also reduced.

9 Claims, 8 Drawing Sheets

(a) Na$_2$S (b) DTT (c) Cysteine

METHOD FOR INITIATING A GRAPHENE OXIDE THROUGH REDUCTION BY A REDUCTANT TO CONTROLLABLY RELEASE ORGANIC COMPOUNDS

CROSS-REFERENCE TO RELATED APPLICATIONS

This application claims priority to Chinese Patent Application No. 201810673157.9 with a filing date of Jun. 26, 2018. The content of the aforementioned applications, including any intervening amendments thereto, are incorporated herein by reference.

TECHNICAL FIELD

The invention belongs to the technical field of purification of water bodies, and in particular relates to a method for initiating a graphene oxide through reduction by a reductant to controllably release organic compounds.

BACKGROUND OF THE INVENTION

The treatment of sewage containing organic contaminants has always been a major problem for the industry. Without effective treatment, these organic contaminants cause great harm to human health and the environment.

At present, the commonly used treatment means is "evaporation and concentration+multi-stage distillation". The sewage containing organics is extracted and separated, the aqueous phase is subjected to evaporation treatment, and the organic phase is subjected to incineration treatment. Evaporation and concentration are not only energy-consuming, but also difficult to process. The stability of the operation is poor. Meanwhile, the incineration of the organic phase not only releases unpleasant odors, causes secondary pollution, but also increases the processing cost.

Accordingly, to solve the above problems, there is also a treatment method of recycling organics. For example, China invention patent with the publication number of CN102040303A uses a pervaporation membrane or a vapor permeation membrane that preferentially permeates organics to separate organics from water in the sewage. The methanol-containing organics is then subjected to steam stripping, and the steamed product is then dehydrated through the pervaporation membrane or the vapor permeation membrane that preferentially permeates water to obtain methanol and derivative products, and the sewage from which organics are removed can be directly discharged into a sewage treatment plant or further processed for use in the production process. Further, Chinese invention patent with the publication number of CN106866412A, uses the water-carrying agent of the acetic acid azeotropic distillation system as the extractant for the PTA-refined sewage, and extracts the organics from the sewage. The extracted phase containing the organic carboxylic acid is returned to the azeotropic distillation column, and then these organic carboxylic acids are withdrawn from the azeotropic distillation column and returned to the PTA oxidation system together with the acetic acid. The raffinate phase is sent to a solvent recovery column and organic solvent is withdrawn from the top of the column to realize the recovery of the organic solvent dissolved in the sewage. However, although these methods recover organic materials, most of them have complicated processes, poor selectivity, and high economic costs.

SUMMARY OF THE INVENTION

An object of the present invention is to provide a method for initiating a graphene oxide through reduction by a reductant, to allow a controllable release of organic compounds.

The technical scheme of the invention is:

A method for initiating a graphene oxide through reduction by a reductant to controllably release organic compounds, comprising the following steps:

(1) mixing a certain amount of the graphene oxide with a certain concentration of a buffer solution to prepare a stock solution;

(2) adding the stock solution to a sewage containing a certain concentration of organic contaminants under stirring condition, to conduct adsorption equilibrium for 24 h;

(3) conducting solid-liquid separation, adding the graphene oxide to which the organic contaminants adsorbed obtained by separation to a pure water, and introducing a certain amount of $N_2$ into the pure water to remove the dissolved oxygen from the pure water;

(4) adding a certain amount of the reductant to reduce the graphene oxide so as to controllably release the adsorbed organic contaminants into the pure water;

(5) conducting sequential batch kinetics experiments and sampling by passing through a membrane of 0.22 μm at certain time intervals, and determining a concentration of the organic contaminants in the pure water by high performance liquid chromatography (HPLC).

Further, a mass ratio of the graphene oxide and the buffer solution is 1:8-10. If the buffer solution is too little, the adsorption of the organic contaminants on the graphene oxide will be weakened, and excessive buffer solution will lead to a secondary pollution of the water body.

Further, the buffer solution is 50 mM Tris-HCl, pH is 7.4-7.5, Tris-HCl has little interference with the biochemical process, does not precipitate with calcium, magnesium ions and heavy metal ions in the sewage, in addition, if pH of the solution is too low, it is easy to make the graphene oxide agglomerate, reduce adsorption sites; if pH of the solution is too high, it is not conducive to a reduction reaction of the graphene oxide.

Further, in step (2), the mass ratio of the organic contaminants and the stock solution is $1:4\times10^5$-$7\times10^5$, and if a ratio of the stock solution to the organic contaminants is too small, it may lead to the organic contaminants in the sewage unable to be completely absorbed, and if the ratio is too large, it may increase the cost for sewage purification, and there may be a secondary pollution of the water body.

Further, the reductant in step (4) is any one of sodium sulfide ($Na_2S$), 1,4-dithiothreitol (DTT), and L-cysteine (Cysteine).

Further, in step (4), the mass ratio of the reductant and the graphene oxide that adsorbs the organic contaminants is 1:20-40. If the reductant is too little, the graphene oxide cannot be sufficiently reduced, which affects the release of the organic contaminant, excessive reductant will not increase the release rate of the organic contaminants and will cause waste of resources instead.

Further, in step (4), the mass ratio of the graphene oxide that adsorbs the organic contaminants and the pure water is 1:20-80. Too little pure water will cause the organic continuants to reach saturation before being completely released. Excessive pure water will consume time and energy during the extraction of the organic contaminants.

Further, the pure water containing organic contaminants in step (4) is filtered and concentrated to selectively recover organic contaminants of small molecule size, to realize waste utilization, and is economical and environmentally friendly.

Further, the organic contaminant is any one of 4-chlorophenol, 4-chloroaniline and chlorobenzene.

The present invention utilizes the size effect and polarity control of GO to selectively adsorb aromatic organic contaminants in sewage, and carries out solid-liquid separation after adsorption equilibrium. The obtained solid phase is GO to which the organic contaminants were adsorbed, and then the solid phase is mixed with a small amount of pure water, nitrogen is introduced to remove the dissolved oxygen, and then a reductant is added. During the process for reducing GO to RGO, the adsorbed organics are gradually released into the pure water, after solid-liquid separation again, the organics are concentrated and purified and RGO can also be recycled. The present invention utilizes the size effect and polarity control of GO to selectively adsorb aromatic organic contaminants in sewage and fully transfer the selectively adsorbed organic contaminants from a large amount of sewage to a small amount of pure water by initiating using the reductant, and no extraction of the organic phase is required, the time for purification is reduced, and the energy consumption for purification is also reduced. In short, the invention has simple process, high selectivity, low processing cost, high economic benefit, and is environmental friendly.

EMBODIMENT OF THE INVENTION

Example 1

Figure 1:
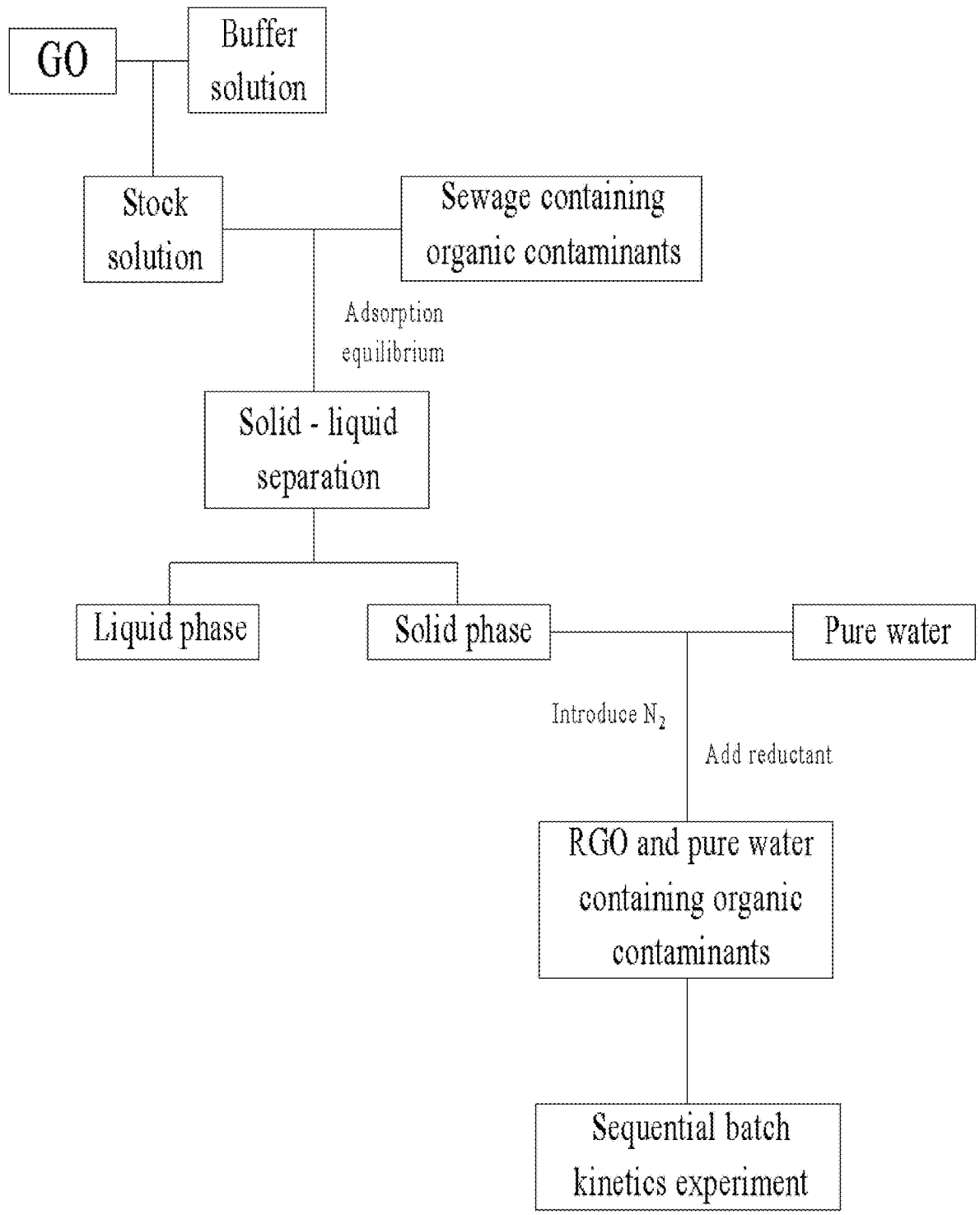
FIG. 1 is a process flow chart of the present invention.

In the present embodiment, a sewage containing 4-chlorophenol is specifically described as the subject. As shown in FIG. 1, the method for initiating a graphene oxide through reduction by a reductant to controllably release organic compounds comprises the following steps:

(1) the graphene oxide was prepared according to the Hummer synthesis method, and the graphene oxide was dispersed in an aqueous solution to obtain a graphene oxide mother solution;

(2) the above graphene oxide mother solution was mixed with 50 mM Tris-HCl, pH 7.5, and the mass of the graphene oxide and Tris-HCl was 1:9 to prepare a stock solution, which was prepared and stored at 25° C. for use;

(3) simulating an actual sewage water sample, 4-chlorophenol (chemically pure) was added to a tap water according to the mass ratio of the organic contaminants and the stock solution of $1:4.3\times10^5$ to formulate a sewage sample of a concentration of 18.4 µmol $L^{-1}$ for use;

(4) under stirring condition, the stock solution prepared in step (1) was added to the sewage sample prepared in step (2), and is subjected to an adsorption equilibrium at a constant temperature of 25° C. for 24 h;

(5) after the adsorption equilibrium was over, the sewage was subjected to solid-liquid separation. The obtained solid phase is graphene oxide to which the organic contaminants adsorbed. The solid phase and the pure water were mixed at a mass ratio of 1:45, while $N_2$ was introduced into the pure water in the amount of 30 ml/min for a time of 30 min, to remove the dissolved oxygen from the pure water so as to prevent the impact of the next step on the reduction reaction;

(6) sodium sulfide ($Na_2S$) was further added to the pure water, wherein the mass ratio of the sodium sulfide ($Na_2S$) and the graphene oxide to which the organic contaminants adsorbed is 1:20, which is used for reducing graphene oxide to allow a controllable release of the adsorbed organic contaminants into pure water, the reaction was conducted at pH=7.5 and 30° C. under constant temperature conditions for 0-72 h;

(7) according to sequential batch kinetics experiment, filter was conducted using 0.22 µm membrane at a reaction time of 0 h, 3 h, 13 h, and 72 h, and 1 ml was sampled. The pure water was determined for the concentration of the organic contaminants by high performance liquid chromatography (HPLC).

Example 2

The influence of different mass ratios of the graphene oxide and the buffer solution on the adsorption distribution coefficient ($K_d$) of graphene oxide was studied:

Using Example 1 as a reference, 4 control groups were set up, each with 3 in parallel. The rest conditions were the same. The mass ratio and adsorption rate of the graphene oxide and Tris-HCl were shown in Table 1 respectively:

TABLE 1

Mass ratios of graphene oxide and Tris - HCl solutions and adsorption distribution coefficient ($K_d$) for each group

| Group | mass ratio | $K_d$ (L/kg) |
| --- | --- | --- |
| Example 1 | 1:9 | 96000 ± 6000 |
| Comparative Example 1 | 1:8.4 | 98000 ± 5000 |
| Comparative Example 2 | 1:10 | 95000 ± 8000 |
| Comparative Example 3 | 1:5.6 | 85000 ± 6000 |
| Comparative Example 4 | 1:20 | 96000 ± 6000 |

Test results: The results of Comparative Example 1 and Comparative Example 2 are substantially the same as that of Example 1, and there is no significant difference. The results of Comparative Example 3 and Comparative Example 4 show some differences. Among them, the adsorption rate of graphene oxide in Comparative Example 3 is reduced by 11.45% compared to Example 1. The results of Comparative Example 4 are not much different from those of Example 1 and Comparative Example 1 and Comparative Example 2, but the amount of Tris-HCl is 2 times more.

Conclusion: When the mass ratio of the graphene oxide and Tris-HCl is too small, it will reduce the effect of graphene oxide dispersion and affect its adsorption capacity. If it is too large, it will cause waste of reagents, increase cost, and lead to secondary pollution of water bodies. The optimum mass ratio of the graphene oxide and Tris-HCl ranges from 1:8 to 10. When the mass ratio is 1:8.4, the result is best.

Example 3

The effect of pH of the solution on the adsorption distribution coefficient ($K_d$) of GO was studied:

Using Example 1 as a reference, 3 control groups were set up, each with 3 in parallel, the rest of the conditions were the same, and the effect of pH of the solution to the adsorption of 4-chlorophenol on graphene oxide were shown in Table 2 respectively:

TABLE 2

Effect of pH of the solution on the adsorption distribution coefficient ($K_d$) of 4 - chlorophenol on GO

| Group | pH | $K_d$ (L/kg) |
| --- | --- | --- |
| Example 1 | 7.5 | 96000 ± 6000 |
| Comparative Example 1 | 5.5 | 24000 ± 2000 |
| Comparative Example 2 | 6.5 | 34000 ± 10000 |
| Comparative Example 3 | 8.5 | 50000 ± 10000 |

Results: The results of Comparative Example 1, Comparative Example 2, Comparative Example 3 and Example 1 are quite different. Among them, the adsorption distribution coefficient of 4-chlorophenol on GO in Comparative Example 3 is decreased by about 47.92% compared to Example 1, the adsorption distribution coefficient in Comparative Example 2 is decreased by about 64.58% compared to Example 1, the adsorption distribution coefficient in Comparative Example 1 is decreased by about 75.00% compared to Example 1.

Conclusion: The low pH makes it easy to agglomerate for the graphene oxide and reduce the adsorption sites, thereby reducing the adsorption capacity of graphene oxide. When pH is high, the negative charge on the surface of the graphene oxide increases, and the polarity interaction with 4-chlorophenol decreases, thereby the adsorption distribution coefficient decreases. When pH is 7.5, the effect is best.

Example 4

The effect of the mass ratio of the organic contaminants and the stock solutions on the adsorption distribution coefficient ($K_d$) and adsorption percentage of graphene oxide:

Using Example 1 as a reference, 4 control groups were set up, each with 3 in parallel, the rest of the conditions were the same, and the effect of the mass ratio of 4-chlorophenol and the stock solution on the adsorption distribution coefficient ($K_d$) and the adsorption percentage of graphene oxide were shown in Table 3:

TABLE 3

Effect of the mass ratio of 4 - chlorophenol and the stock solution on the adsorption distribution coefficient ($K_d$) and solid adsorption amount of GO

| Group | 4 - chlorophenol: Stock solution | $K_d$ (L/kg) | solid adsorption amount (mg/kg) |
| --- | --- | --- | --- |
| Example 1 | 1:4.3 × 10$^5$ | 99000 ± 6000 | 170000 |
| Comparative Example 1 | 1:7.1 × 10$^5$ | 100000 ± 5000 | 130000 |
| Comparative Example 2 | 1:1.3 × 10$^6$ | 101000 ± 7000 | 70000 |
| Comparative Example 3 | 1:3.0 × 10$^5$ | 64000 ± 2000 | 160000 |
| Comparative Example 4 | 1:2.0 × 10$^5$ | 60000 ± 2000 | 240000 |

Results: The results of the adsorption distribution coefficient of GO to 4-chlorophenol in Comparative Example 1 and Comparative Example 2 are substantially the same as that of Example 1, but the solid phase adsorption amount per unit is significantly reduced. In Comparative Example 3 and Comparative Example 4, although the solid phase adsorption amount of 4-chlorophenol on graphene oxide is increased, the adsorption distribution coefficient to the organic contaminants was significantly reduced.

Conclusion: if the ratio of 4-chlorophenol to the stock solution is too small, it will lead to the adsorption distribution coefficient of graphene oxide to 4-chlorophenol in the stock solution, and thus cannot achieve the goal of complete adsorption of 4-chlorophenol; if the ratio of 4-chlorophenol to the stock solution is too large, it will result in a decrease in the solid phase amount of adsorption per unit, ie, increase the treatment cost. The optimal mass ratio of 4-chlorophenol and the stock solution ranges from 1:3×10$^5$-7×10$^5$, when the chlorophenol and the stock solution are 1:4.3×10$^5$, the result is best.

Example 5

The effect of the mass ratio of the reductant ($Na_2S$) and the graphene oxide (AGO) to which the organic contaminants adsorbed on the release rate of the organic contaminants (4-chlorophenol) was studied:

Using Example 1 as a reference, 4 control groups were set up, each with 3 in parallel, the rest of the conditions were the same. The mass ratio of $Na_2S$ and AGO and the release rate of 4-chlorophenol were shown in Table 4 respectively:

TABLE 4

Effect of mass ratio of $Na_2S$ and AGO on the release rate of 4 -chlorophenol

| Group | $Na_2S$:AGO | release rate |
| --- | --- | --- |
| Example 1 | 1:20 | 100% |
| Comparative Example 1 | 1:25 | 99.99% |
| Comparative Example 2 | 1:30 | 99.99% |
| Comparative Example 3 | 1:10 | 80.23% |
| Comparative Example 4 | 1:15 | 94.56% |

Result: the results of Comparative Example 1 and Comparative Example 2 and the release rate of Example 1 were all close to 100%, and the effects were good. The results of Comparative Example 3 and Comparative Example 4 show some differences. Among them, the release rate of Comparative Example 3 is significantly reduced compared to that of Example 1, and the release rate of 4-chlorophenol in Comparative Example 4 is slightly reduced compared to that of Example 1.

Conclusion: Because the mass ratio of $Na_2S$ and AGO is too small, graphene oxide can not be completely reduced, which reduces the release rate of 4-chlorophenol. In addition, excessive Na$_2$S has no obvious increase in the release rate of 4-chlorophenol. Therefore, the optimal mass ratio of Na$_2$S and AGO is in the range of 1:20-40. When Na$_2$S and AGO are 1:20, the result is best.

Example 6

The effect of the mass ratio of graphene oxide (AGO) to which the organic contaminants adsorbed and the pure water on the release rate of 4-chlorophenol and the extraction time were studied:

Using Example 1 as a reference, 4 control groups were set up, each with 3 in parallel, the rest of the conditions were the same. The mass ratio of AGO and the pure water, the release rate of 4-chlorophenol and the extraction time were shown in Table 5:

TABLE 5 the mass ratio of AGO and the pure water and the release rate of 4 - chlorophenol and the extraction time

| Group | AGO:Pure Water | Release Rate | Extraction Time |
|---|---|---|---|
| Example 1 | 1:45 | 100% | 105 min |
| Comparative | 1:32 | 99.98% | 94 min |
| Comparative | 1:78 | 99.99% | 116 min |
| Comparative | 1:15 | 87.69% | 90 min |
| Comparative | 1:180 | 99.98% | 178 min |

Results: The release rates of Comparative Example 1, Comparative Example 2 and Comparative Example 4 and Example 1 are all similar, but time for extracting 4-chlorophenol from pure water in Comparative Example 4 is far more longer than the other groups. There is a significant drop in the release rate in Comparative Example 3 compared to Example 1.

Conclusion: If the ratio of AGO:pure water is too large, it will increase the extraction time of the organic contaminants (4-chlorophenol), and then increase energy consumption; if the ratio of AGO:pure water is too small, the organic contaminants (4-Chlorophenol) will reach its maximum saturation level before it has been completely released owing to little pure water. The optimum mass ratio of AGO and the pure water ranges from 1:20-80. When AGO: pure water is 1:45, the effect is best.

Example 7

The difference between the present example and Example 1 lies in that the reductant in this example is 1,4-dithiothreitol (DTT), and all other parameters and methods are the same as those of Example 1.

Example 8

The difference between the present example and Example 1 lies in that the reductant of this example is L-cystine (Cysteine), and all other parameters and methods are the same as those in Example 1.

Example 9

The difference between the present example and Example 1 lies in that the sewage containing 4-chloroaniline is used as subject in this example, and all other parameters and methods are the same as in Example 1.

Example 10

The difference between the present example and Example 1 lies in that the sewage containing chlorobenzene is used as subject of this example, and all other parameters and methods are the same as those in Example 1.

Example 11

The difference between the present example and Example 7 lies in that the sewage containing 4-chloroaniline is used as subject in this example, and all other parameters and methods are the same as those in Example 7.

Example 12

The difference between the present example and Example 7 lies in that the sewage containing chlorobenzene is used as subject in this example, and all other parameters and methods are the same as those in Example 7.

Example 13

The difference between the present example and Example 8 lies in that the sewage containing 4-chloroaniline is used as subject in this example, and all other parameters and methods are the same as those in Example 8.

Example 14

The difference between the present example and Example 8 lies in that the sewage containing chlorobenzene is used as subject in this example, and all other parameters and methods are the same as those of Example 8.

Example 15

The difference between the present example and Example 10 lies in that the sewage containing benzene is used as subject in this example, and all other parameters and methods are the same as those of Example 10.

Example 16

The difference between the present example and Example 10 lies in that the sewage containing naphthalene is used as subject in the present example, and all other parameters and methods are the same as those of Example 10.

Example 17

The difference between the present example and Example 10 lies in that the sewage containing phenanthrene is used as subject in this example, and all other parameters and methods are the same as those of Example 10.

Example 18

The difference between the present example and Example 10 lies in that the sewage containing 1,4-dichlorobenzene is used as subject in this example, and all other parameters and methods are the same as those in Example 10.

Example 19

The difference between the present example and Example 10 lies in that the sewage containing 1,3,5-trichlorobenzene is used as subject in this example, and all other parameters and methods are the same as those in Example 10.

Analysis and Summary (1) Effects of Different Reductants on the Release Kinetics of Graphene Oxide (GO) in Different Organic Contaminant Environments.

Example 1, Example 7, Example 8, Example 9, Example 10, Example 11, Example 12, Example 13, and Example 14 were respectively subjected to dynamic tests. Reductants and organic contaminants of various examples are shown in Table 6;

TABLE 6

Reductants and Organic Contaminants of Various Examples

| Group | Reductant | Organic Contaminants |
|---|---|---|
| Example 1 | $Na_2S$ | 4 - chlorophenol |
| Example 7 | DTT | 4 - chlorophenol |
| Example 8 | Cysteine | 4 - chlorophenol |
| Example 9 | $Na_2S$ | 4 - chloroaniline |
| Example 10 | $Na_2S$ | chlorobenzene |
| Example 11 | DTT | 4 - chloroaniline |
| Example 12 | DTT | chlorobenzene |
| Example 13 | Cysteine | 4 - chloroaniline |
| Example 14 | Cysteine | chlorobenzene |

Figure 2A:
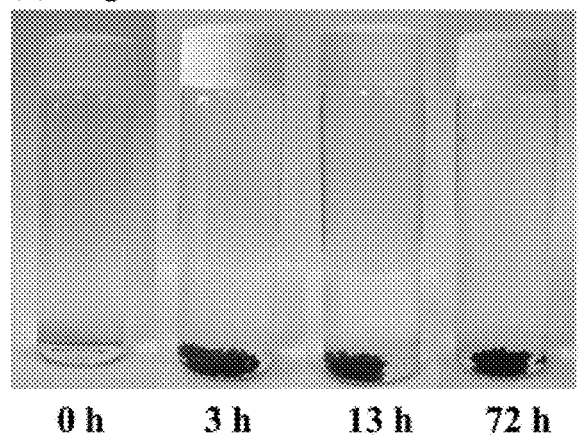
FIG. 2a is a state diagram of Example 1 in which $Na_2S$ is mixed with GO that adsorbs organic contaminants and pure water at 0 h, 3 h, 13 h, and 72 h.
Figure 2B:
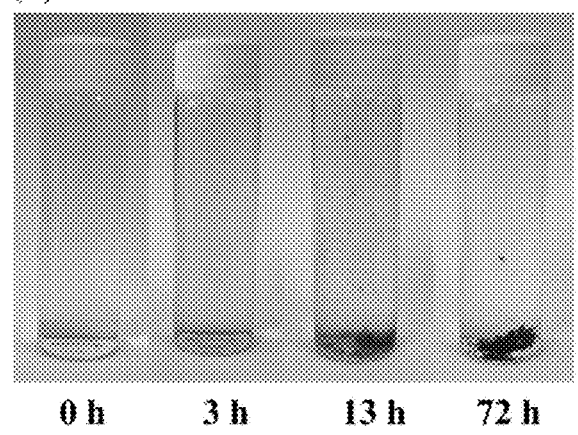
FIG. 2b is a state diagram of Example 1 in which DTT is mixed with GO that adsorbs organic contaminants and pure water at 0 h, 3 h, 13 h, and 72 h.
Figure 2C:
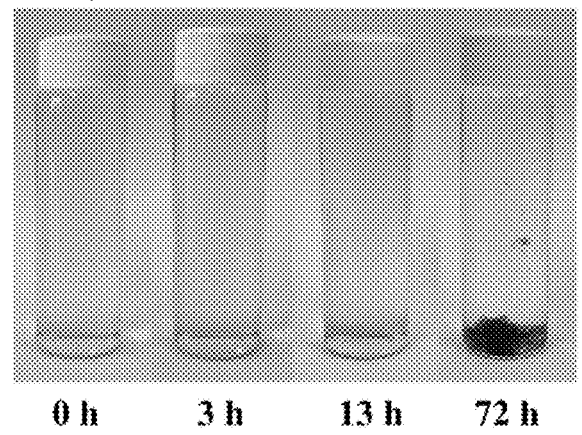
FIG. 2c is a state diagram of the Example 1 in which Cysteine is mixed with GO that adsorbs organic contaminants and pure water at 0 h, 3 h, 13 h and 72 h.
Figure 3A:
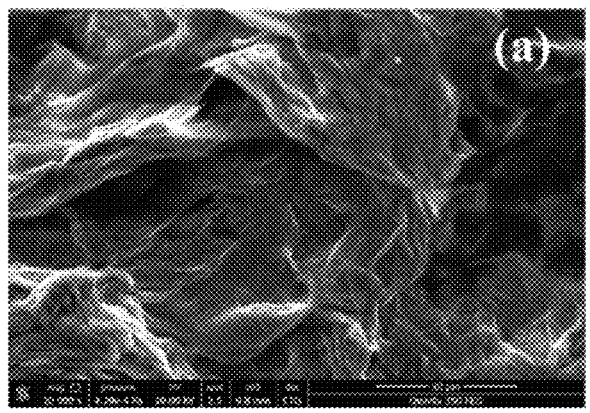
FIG. 3a is a scanning electron micrograph when GO is not reduced.
Figure 3B:
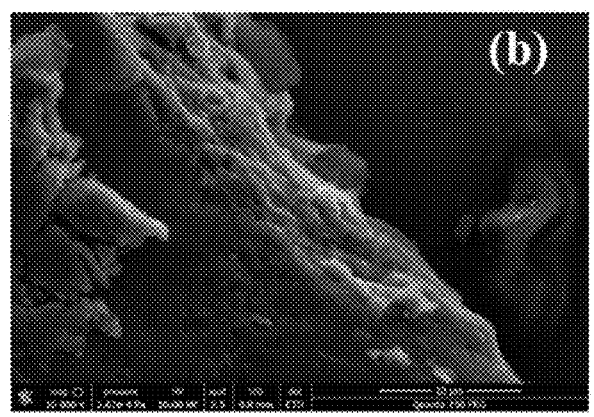
FIG. 3b is a scanning electron micrograph of GO treated with cysteine in Example 8.
Figure 3C:
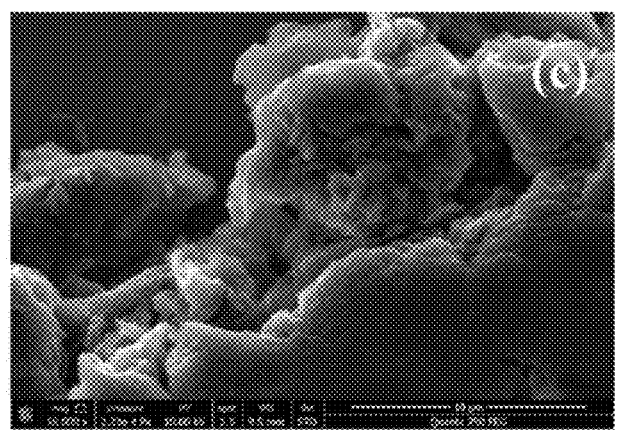
FIG. 3c is a scanning electron micrograph of GO treated with DTT in Example 7.
Figure 3D:
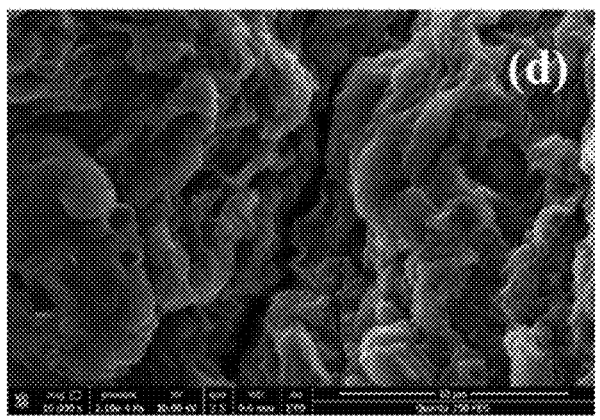
FIG. 3d is a scanning electron micrograph of GO treated with $Na_2S$ in Example 1.

FIGS. 2a, 2b, and 2c show the states diagram of $Na_2S$, DTT, Cysteine, and graphene oxide (AGO) to which the organic contaminants adsorbed and pure water mixed for 0 h, 3 h, 13 h, and 72 h, respectively; it is obvious that the first time for appearance of agglomeration becomes longer in FIGS. 2a, 2b, and 2c.

FIGS. 3a, 3b, 3c, and 3d are scanning electron micrograph of GO without GO, Cysteine-treated GO, DTT-treated GO, and $Na_2S$-treated GO, respectively; it is obvious that the degree of agglomeration of GO gradually increases in FIGS. 3a, 3b, 3c, and 3d.

Figure 4A:
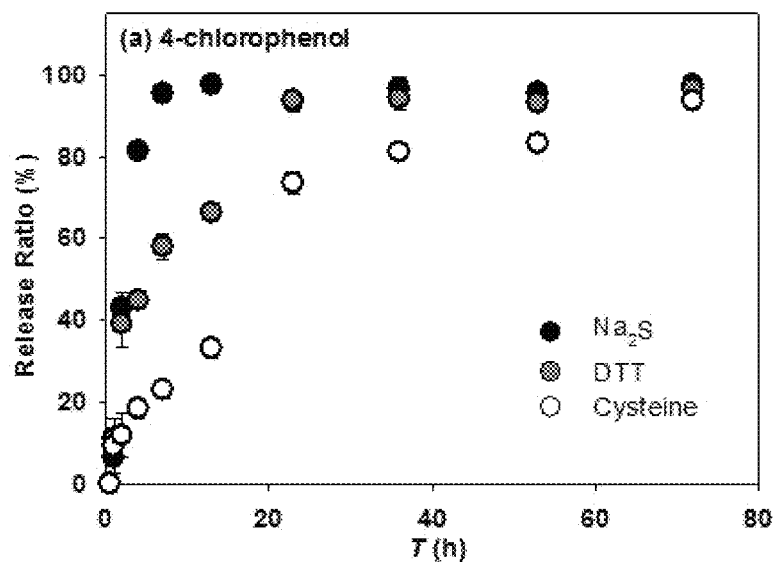
FIG. 4a is a graph showing the results of the kinetic test of 4-chlorophenol by $Na_2S$ of Example 1, DTT of Example 1, and Cysteine of Example 8 respectively.
Figure 4B:
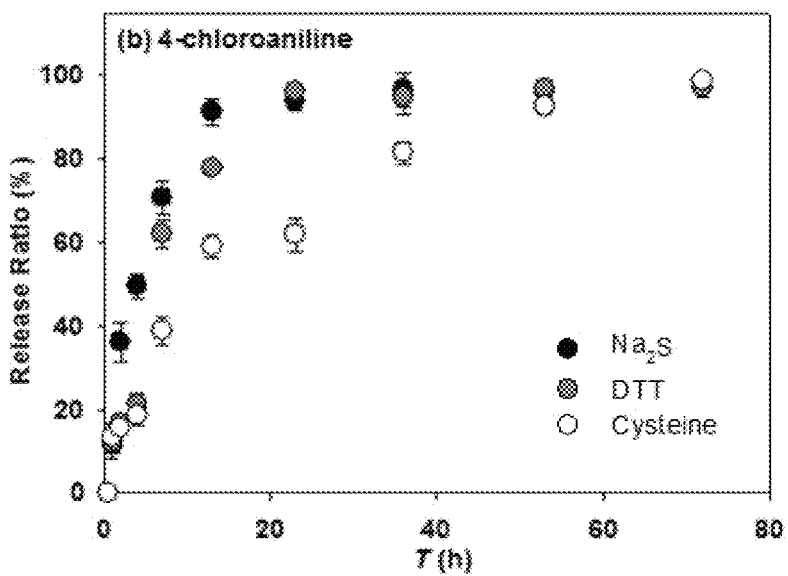
FIG. 4b is a graph showing the results of kinetic tests of 4-chloroaniline by $Na_2S$ of Example 9, DTT of Example 11, and Cysteine of Example 13, respectively.
Figure 4C:
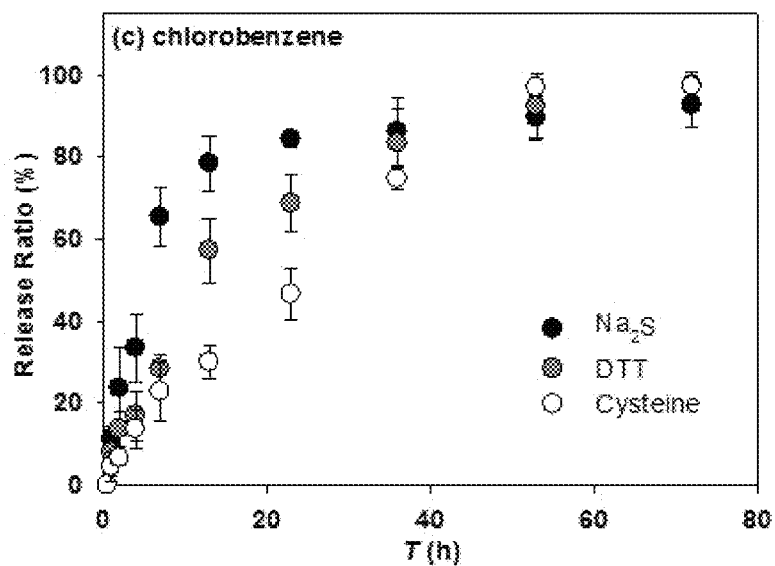
FIG. 4c is a graph showing the kinetic test results of chlorobenzene by $Na_2S$ of Example 10, DTT of Example 12, and Cysteine of Example 14.

The kinetic test results are shown in FIGS. 4a, 4b and 4c. It can be seen that the effect the three compounds on the release rate is significant. Taking 4-chlorophenol as an example, it can be seen from FIG. 4a that the release rate of 4-chlorophenol from $Na_2S$-treated GO reaches 100% within 13 h; the release rate of 4-chlorophenol from DTT-treated GO reaches 100% within 20 h; the release rate of 4-chlorophenol from Cysteine-treated GO reaches 100% within 50 h; likewise, taking 4-chloroaniline and chlorobenzene as examples, the same phenomenon can also be observed in FIGS. 4b and 4c.

(2) Selective Adsorption Analysis of Graphene Oxide (GO) on Different Organic Contaminants.

Example 1, Example 9, Example 10, Example 15, Example 16, Example 17, Example 18, and Example 19 were respectively subjected to adsorption tests. The organic contaminants of various examples are shown in Table 7;

TABLE 7

Organic Contaminants of Various Examples

| Group | Organic contaminants |
|---|---|
| Example 1 | 4 - chlorophenol |
| Example 9 | 4 - chloroaniline |
| Example 10 | chlorobenzene |
| Example 15 | benzene |
| Example 16 | naphthalene |
| Example 17 | phenanthrene |
| Example 18 | 1,4 - dichlorobenzene |
| Example 19 | 1,3,5 - trichlorobenzene |

Figure 5A:
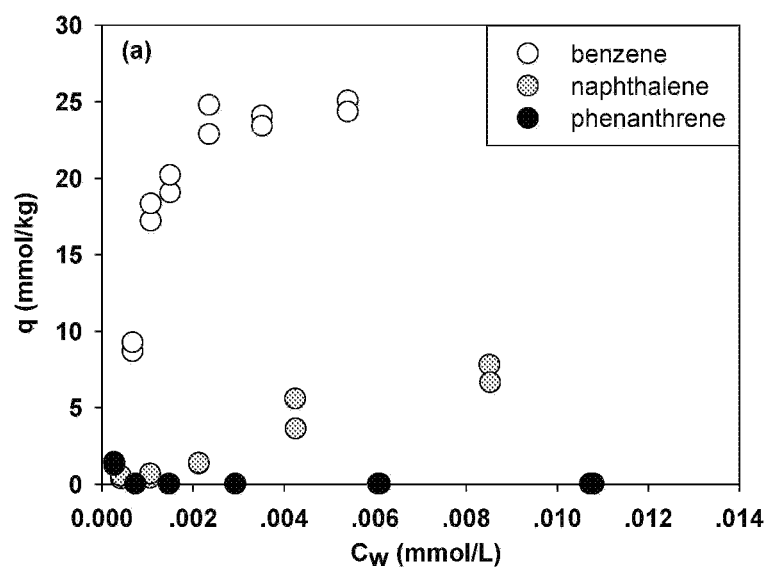
FIG. 5a is an adsorption isotherm of phenanthrene in Example 15, naphthalene in Example 16, and phenanthrene in Example 17 on GO.
Figure 5B:
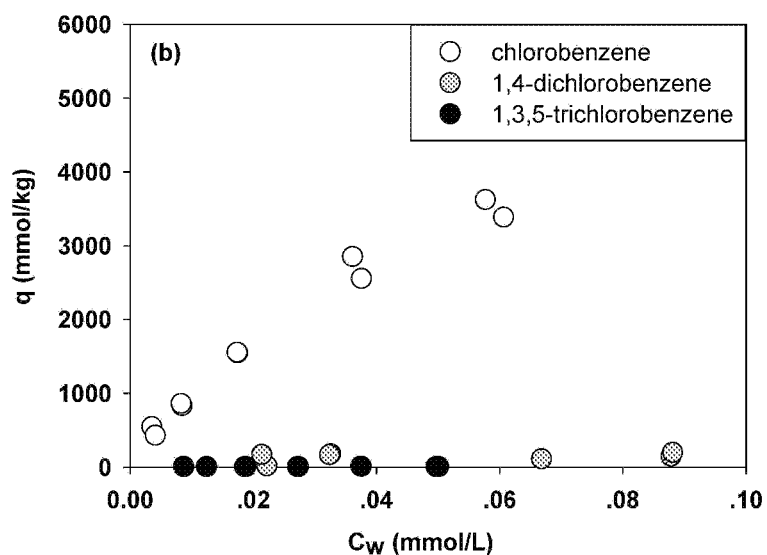
FIG. 5b is an adsorption isotherm of chlorobenzene of Example 10, 1,4-dichlorobenzene of Example 18, and 1,3,5-trichlorobenzene of Example 19 on GO.
Figure 5C:
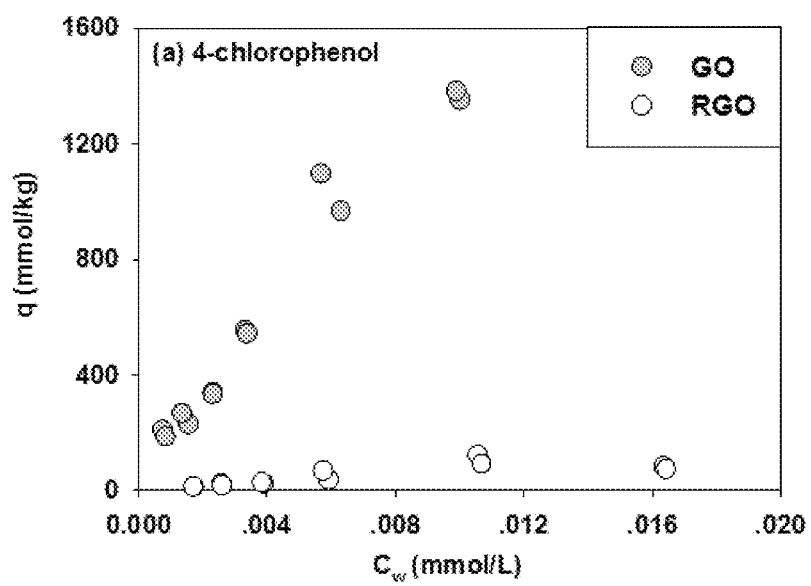
FIG. 5c is an adsorption isotherm of 4-chlorophenol of Example 1 on GO and RGO.
Figure 5D:
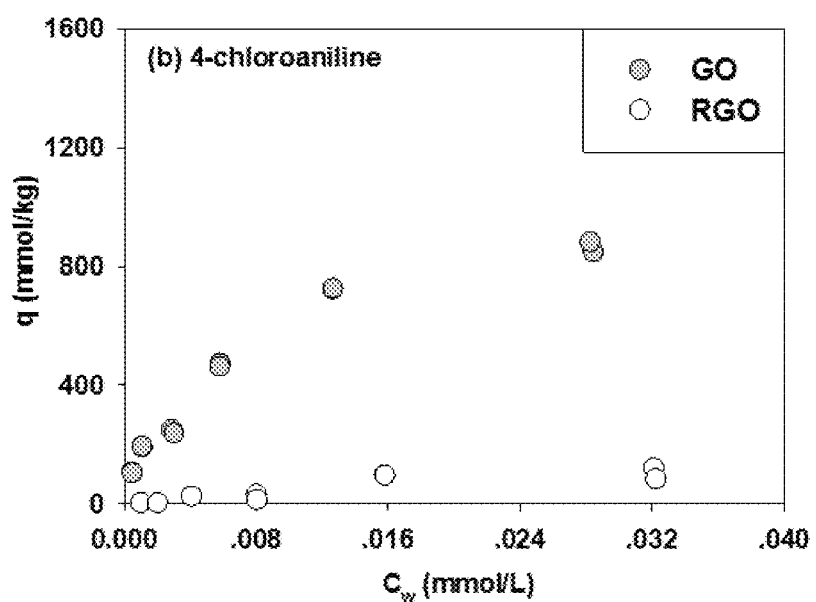
FIG. 5d is an adsorption isotherm of 4-chloroaniline of Example 9 on GO and RGO.

FIG. 5a shows the adsorption isotherms of benzene, naphthalene and phenanthrene on graphene oxide; FIG. 5b shows the adsorption isotherms of chlorobenzene, 1,4-dichlorobenzene and 1,3,5-trichlorobenzene on graphene oxide. FIG. 5c is the adsorption isotherm of 4-chlorophenol on graphene oxide and reduced graphene oxide; FIG. 5d is the adsorption isotherm of 4-chloroaniline on graphene oxide and reduced graphene oxide; The liquid phase concentration (Cw) and the solid phase concentration (q) are plotted.

From FIGS. 5a and 5b, it can be seen that graphene oxide (GO) has strong selective adsorption of non-polar organic contaminants such as benzene and chlorobenzene with smaller molecular size, and its adsorption distribution coefficient ($K_d$) reaches $10^4$-$10^5$ L/kg, which is mainly attributed to the hydrophobic interaction between the non-polar aromatic regions which match the size of the graphene oxide material. In contrast, the adsorption affinities of relatively large molecular sizes of 1,4-dichlorobenzene, 1,3,5-trichlorobenzene, naphthalene and phenanthrene on graphene oxide are very weak, and their adsorption distribution coefficient ($K_d$) is only $10^0$-$10^2$ L/kg, which can be explained by the non-polar size effect.

As can be seen from FIGS. 5c and 5d, for the polar organic contaminants (4-chlorophenol and 4-chloroaniline) with similar molecular size, their adsorption affinity on graphene oxide is selectively enhanced, and the adsorption distribution coefficient ($K_d$) reaches $10^3$-$10^5$ L/kg, which is mainly attributed to the polar interaction between the polar functional groups and the epoxy/hydroxyl groups on the polar regions of the graphene oxide, thereby reducing the size effect in the non-polar regions.

(3) Summary

1) By comparing the oxygen content of GO and RGO, as shown in Table 8, it was found that $Na_2S$ has the strongest reducing ability, followed by DTT and Cysteine. It is known that the reducing ability of the reductant itself is a direct influencing factor for its release rate. On the one hand, the surface oxygen content of graphene oxide can be reduced by a reductant. Therefore, the epoxy/hydroxyl groups on the polar region of GO treated by $Na_2S$ are reduced, which are significantly higher than that of GO treated by DTT and GO treated by Cysteine. Therefore, the polar interaction with contaminants is weakened most significantly and the release rate of the contaminants are fast. On the other hand, as the surface oxygen content of GO decreases, the degree of agglomeration of GO is also affected by the surface oxygen content, as shown in FIGS. 2a-c and FIGS. 3a-d. It is noted that the agglomerated size of $Na_2S$-treated GO is 12700±4300 nm; followed by DTT-treated GO (6300±1800 nm) and Cysteine-treated GO (3000±1200 nm). The above characterization demonstrated that graphene oxide undergoes agglomeration after reduction, and the available adsorption sites are reduced, so that the originally adsorbed organic contaminants are completely released. In general, the release rate of $Na_2S$ as a reductant for organic contaminants is faster than that of DTT and Cysteine, however DTT and Cysteine as amino acid reductants are more environmentally friendly than $Na_2S$.

TABLE 8

Chemical and Structural Properties of Graphene Oxide (GO) and Reduced Graphene Oxide (RGO)

| Sample Name | Reductant | Surface Element Composition[a] C (%) | | | | | O (%) | C/O | $I_D/I_G$[b] | Interlayer space[c] (nm) | Size of agglomeration[d] (nm) |
|---|---|---|---|---|---|---|---|---|---|---|---|
| | | C—C | C—O—C | C—OH | C═O | Total C | | | | | |
| pristine GO | / | 32.68 | 28.24 | BDL[e] | 4.04 | 64.97 | 33.02 | 1.97 | 0.87 | 0.90 | 1600 ± 200 |
| RGO (3 h) | Cysteine | 42.93 | BDL | 26.13 | 2.69 | 71.75 | 26.57 | 2.70 | ND[f] | ND | 3100 ± 1400 |
| RGO (13 h) | Cysteine | 39.04 | BDL | 29.19 | 4.80 | 73.03 | 24.86 | 2.93 | ND | ND | 3000 ± 1200 |
| RGO (72 h) | Cysteine | 45.68 | BDL | 23.12 | 6.46 | 75.26 | 21.75 | 3.46 | 1.14 | 0.49 | 5200 ± 1700 |
| RGO (3 h) | DTT | 40.34 | BDL | 25.91 | 5.09 | 71.34 | 26.72 | 2.67 | ND | ND | 2400 ± 800 |
| RGO (13 h) | DTT | 46.96 | BDL | 20.46 | 6.05 | 73.48 | 24.19 | 3.03 | ND | ND | 3800 ± 900 |
| RGO (72 h) | DTT | 51.84 | BDL | 19.34 | 8.45 | 79.64 | 18.98 | 4.20 | 1.19 | 0.44 | 6300 ± 1800 |
| RGO (3 h) | Na$_2$S | 43.52 | BDL | 22.51 | 5.69 | 71.72 | 26.98 | 2.66 | ND | ND | 4700 ± 1000 |
| RGO (13 h) | Na$_2$S | 48.69 | BDL | 22.97 | 4.08 | 75.76 | 22.54 | 3.36 | ND | ND | 6300 ± 3200 |
| RGO (72 h) | Na$_2$S | 54.77 | BDL | 23.97 | 2.84 | 81.59 | 16.35 | 4.99 | 1.22 | 0.37 | 12700 ± 4300 |

2) The present invention is suitable for selective adsorption of non-polar organic contaminants such as benzene and chlorobenzene which have a small molecular size, and polar organic contaminants (4-chlorophenol and 4-chloroaniline) which have similar molecular size.

The above description of the embodiment is only for the purpose of understanding the method of the present invention and its core idea. It is noted that those skilled in the art can make several improvements and modifications to the present invention without departing from the principle of the present invention, and these improvements and modifications will also fall within the protection scope of the present invention.

We claim:

1. A method for initiating a graphene oxide through reduction by a reductant to controllably release organic compounds, comprising the following steps:
   (1) mixing a certain amount of the graphene oxide with a certain concentration of a buffer solution to prepare a stock solution;
   (2) adding the stock solution to a sewage containing a certain concentration of organic contaminants under stirring condition, to conduct adsorption equilibrium for 24 h;
   (3) conducting solid-liquid separation, adding the graphene oxide to which the organic contaminants adsorbed obtained by separation to a pure water, and introducing a certain amount of N$_2$ into the pure water to remove the dissolved oxygen from the pure water;
   (4) adding a certain amount of the reductant to reduce the graphene oxide so as to controllably release the adsorbed organic contaminants into the pure water;
   (5) conducting sequential batch kinetics experiments and sampling by passing through a membrane of 0.22 μm at certain time intervals, and determining a concentration of the organic contaminants in the pure water by high performance liquid chromatography (HPLC).

2. The method according to claim 1, wherein the mass ratio of the graphene oxide and the buffer solution is 1:8-10.

3. The method according to claim 1, wherein the buffer solution is 50 mM Tris-HCl, pH 7.4-7.5.

4. The method according to claim 1, wherein the mass ratio of the organic contaminants and the stock solution in step (2) is 1:4×10$^5$-7×10$^5$.

5. The method according to claim 1, wherein the reductant in step (4) is any one of sodium sulfide (Na$_2$S), 1,4-dithiothreitol (DTT), and L-cysteine (Cysteine).

6. The method according to claim 1, wherein the mass ratio of the reductant and the graphene oxide to which the organic contaminants adsorbed in step (4) is 1:20-40.

7. The method according to claim 1, wherein the mass ratio of the graphene oxide to which the organic contaminants adsorbed and the pure water in step (4) is 1:20-80.

8. The method according to claim 1, wherein the pure water containing the organic contaminants in step (4) is subject to filter and concentration for selective recovery of organic contaminants of small molecular size.

9. The method according to claim 1, wherein the organic contaminant is any one of 4-chlorophenol, 4-chloroaniline and chlorobenzene.

* * * * *